(12) United States Patent
Rosenberg et al.

(10) Patent No.: US 8,675,642 B2
(45) Date of Patent: *Mar. 18, 2014

(54) USING PSTN REACHABILITY TO VERIFY VOIP CALL ROUTING INFORMATION

(75) Inventors: Jonathan Rosenberg, Freehold, NJ (US); Cullen F. Jennings, Santa Cruz, CA (US); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,486

(22) Filed: Jun. 11, 2012

(65) Prior Publication Data

US 2012/0243530 A1    Sep. 27, 2012

Related U.S. Application Data

(63) Continuation of application No. 11/780,928, filed on Jul. 20, 2007, now Pat. No. 8,199,746.

(51) Int. Cl.
 *H04L 12/28* (2006.01)

(52) U.S. Cl.
 USPC ............ 370/353; 370/352; 370/400; 370/401

(58) Field of Classification Search
 None
 See application file for complete search history.

(56) References Cited

U.S. PATENT DOCUMENTS

| | | | |
|---|---|---|---|
| 5,590,370 A | 12/1996 | Asthana et al. | 395/800 |
| 5,699,514 A | 12/1997 | Durinovic-Johri et al. | 395/188.01 |
| 6,012,144 A | 1/2000 | Pickett | 713/201 |
| 6,088,683 A | 7/2000 | Jalili | 705/26 |
| 6,295,575 B1 | 9/2001 | Blumenau et al. | 711/5 |
| 6,404,870 B1 | 6/2002 | Kia et al. | 379/144.01 |
| 6,529,501 B1 | 3/2003 | Zhao et al. | 370/353 |
| 6,674,850 B2 | 1/2004 | Vu et al. | 379/220.01 |
| 6,700,964 B2 | 3/2004 | Schmid et al. | 379/189 |
| 6,950,652 B2 | 9/2005 | Janssen et al. | 455/419 |
| 6,961,334 B1 | 11/2005 | Kaczmarczyk | 370/354 |
| 7,016,343 B1 | 3/2006 | Mermel et al. | 370/356 |

(Continued)

FOREIGN PATENT DOCUMENTS

| | | |
|---|---|---|
| CN | 1965564 | 5/2007 |
| CN | 101184014 A | 5/2008 |

(Continued)

OTHER PUBLICATIONS

Wu, T., The SRP Authentication and Key Exchange System, RFC 2945, pp. 1-11, The Internet Society, dated Sep. 2000.

(Continued)

*Primary Examiner* — Hassan Phillips
*Assistant Examiner* — Mark A Mais
(74) *Attorney, Agent, or Firm* — Brinks Gilson & Lione

(57) ABSTRACT

A system for verifying VoIP call routing information. In particular implementations, a method includes verifying one or more Voice-over-Internet-Protocol (VoIP) call agents for respective destination telephone numbers based on demonstrated knowledge of previous public switched telephone network (PSTN) calls to the respective destination telephone numbers; receiving a call initiation message identifying a destination telephone number; and conditionally initiating a call over a VoIP network to a target VoIP call agent, or over a circuit switched network, based on whether the target VoIP call agent has been verified for the destination telephone number identified in the call initiation message.

20 Claims, 9 Drawing Sheets

(56) References Cited

U.S. PATENT DOCUMENTS

| | | | |
|---|---|---|---|
| 7,143,052 B2 | 11/2006 | LaSalle et al. | 705/7 |
| 7,188,138 B1 | 3/2007 | Schneider | 709/203 |
| 7,190,772 B2 | 3/2007 | Moisey et al. | 379/114.27 |
| 7,218,722 B1 | 5/2007 | Turner et al. | 379/221.02 |
| 7,266,114 B2 | 9/2007 | Furukawa et al. | 370/352 |
| 7,289,493 B1 | 10/2007 | Vera | 370/356 |
| 7,352,856 B2 | 4/2008 | Matsuhashi et al. | 379/387.02 |
| 7,383,572 B2 | 6/2008 | Rolfe | 726/5 |
| 7,394,803 B1 | 7/2008 | Petit-Huguenin et al. | 370/352 |
| 7,457,283 B2 | 11/2008 | Dalton, Jr. et al. | 370/352 |
| 7,570,631 B2 | 8/2009 | Bennett | |
| 7,602,734 B2 | 10/2009 | Tang et al. | 370/254 |
| 7,729,700 B2 | 6/2010 | Alemany et al. | 455/436 |
| 7,822,188 B1 | 10/2010 | Kirchhoff et al. | 379/211.02 |
| 7,852,831 B2 | 12/2010 | Akbar | 370/352 |
| 7,855,982 B2 | 12/2010 | Ramankutty et al. | 370/259 |
| 7,983,243 B2 | 7/2011 | Casey et al. | 370/352 |
| 8,040,875 B2 | 10/2011 | Barclay et al. | 370/352 |
| 8,072,967 B2 | 12/2011 | Rosenberg et al. | 370/352 |
| 8,199,746 B2 | 6/2012 | Rosenberg et al. | 370/353 |
| 8,204,047 B2 | 6/2012 | Rosenberg et al. | |
| 8,223,754 B2 | 7/2012 | Rosenberg | |
| 8,223,755 B2 | 7/2012 | Jennings et al. | |
| 8,228,902 B2 | 7/2012 | Mehmood et al. | |
| 8,228,903 B2 | 7/2012 | Rosenberg et al. | |
| 8,228,904 B2 | 7/2012 | Rosenberg et al. | |
| 8,274,968 B2 | 9/2012 | Rosenberg et al. | |
| 2001/0032310 A1 | 10/2001 | Corella | 473/524 |
| 2002/0004900 A1 | 1/2002 | Patel | 713/155 |
| 2003/0053605 A1 | 3/2003 | Cashiola | 379/88.17 |
| 2003/0055898 A1 | 3/2003 | Yeager et al. | 709/205 |
| 2003/0204741 A1* | 10/2003 | Schoen et al. | 713/200 |
| 2004/0067761 A1 | 4/2004 | Pyhalammi et al. | 455/466 |
| 2005/0232428 A1 | 10/2005 | Little et al. | 380/277 |
| 2006/0182029 A1 | 8/2006 | Kealy et al. | 370/230 |
| 2006/0216131 A1 | 9/2006 | Jhuang | 411/181 |
| 2006/0294576 A1 | 12/2006 | Cross et al. | 726/1 |
| 2007/0183396 A1 | 8/2007 | Bennett et al. | |
| 2007/0183398 A1 | 8/2007 | Bennett et al. | |
| 2007/0183400 A1 | 8/2007 | Bennett et al. | |
| 2007/0183405 A1 | 8/2007 | Bennett | |
| 2007/0183406 A1 | 8/2007 | Bennett | |
| 2007/0183407 A1 | 8/2007 | Bennett et al. | |
| 2007/0183409 A1 | 8/2007 | Bennet | |
| 2007/0183412 A1 | 8/2007 | Bennett | |
| 2007/0183440 A1 | 8/2007 | Bennet et al. | 370/419 |
| 2007/0201451 A1 | 8/2007 | Bennett | |
| 2007/0201660 A1 | 8/2007 | Lan et al. | 379/201.01 |
| 2007/0201688 A1 | 8/2007 | Bennett | |
| 2007/0248098 A1 | 10/2007 | Chen | 370/395.2 |
| 2007/0297395 A1 | 12/2007 | Chiu | |
| 2008/0052270 A1 | 2/2008 | Karlsson | 707/3 |
| 2008/0292077 A1 | 11/2008 | Vinokurov et al. | 379/142.04 |
| 2009/0022149 A1 | 1/2009 | Rosenberg et al. | |
| 2009/0022150 A1 | 1/2009 | Rosenberg et al. | 370/389 |
| 2009/0022155 A1 | 1/2009 | Rosenberg et al. | 370/392 |
| 2009/0025075 A1 | 1/2009 | Chow et al. | 726/10 |
| 2009/0100262 A1 | 4/2009 | Yoo | 713/155 |
| 2009/0323677 A1 | 12/2009 | Mehmood et al. | 370/352 |
| 2010/0002686 A1 | 1/2010 | Rosenberg et al. | 370/352 |
| 2010/0002687 A1 | 1/2010 | Rosenberg et al. | 370/352 |
| 2010/0046507 A1 | 2/2010 | Rosenberg et al. | 370/352 |
| 2010/0082828 A1 | 4/2010 | Jennings et al. | 709/229 |
| 2010/0157853 A1 | 6/2010 | Li et al. | 370/271 |
| 2010/0202438 A1 | 8/2010 | Rosenberg | 370/352 |
| 2010/0202439 A1 | 8/2010 | Rosenberg et al. | 370/352 |
| 2012/0106401 A1 | 5/2012 | Rosenberg et al. | 370/259 |
| 2012/0243530 A1 | 9/2012 | Rosenberg et al. | |

FOREIGN PATENT DOCUMENTS

| | | | |
|---|---|---|---|
| CN | 101278569 | 10/2008 | |
| EP | 1 009 153 A1 | 6/2000 | H04M 7/00 |
| EP | 1 385 323 A1 | 1/2004 | H04M 7/00 |
| EP | 1 555 786 A1 | 7/2005 | H04L 29/06 |
| EP | 1 885 104 A1 | 2/2008 | H04M 1/253 |
| JP | 2004-040541 | 2/2004 | H04M 3/00 |
| JP | 2004-304281 | 10/2004 | H04L 12/66 |
| WO | WO2005/057354 A2 | 6/2005 | |
| WO | WO2007/037802 A1 | 4/2007 | |
| WO | WO 2009/014974 A1 | 1/2009 | H04M 7/12 |

OTHER PUBLICATIONS

Rosenberg, J., Jennings, C., The Session Initiation Protocol (SIP) and Spam, dated Jan. 2008, pp. 1-21, The IETF Trust.

Falstrom, P., "E 164 number and DNS", Request for Comments No. 2916, Network Working Group, dated Sep. 2000, pp. 1-9, Cisco Systems, Inc.

International Search Report, dated Dec. 12, 2008, pp. 1-5, International Application No. PCT/US2008/070259, European Patent Office, The Netherlands.

Written Opinion, dated Dec. 12, 2008, pp. 1-6, International Patent Application No. PCT/US2008/070259, European Patent Office, Germany.

Call detail record, available at http://en.wikipedia.org/wiki/Call_detail_record, Wikipedia, dated May 5, 2009, p. 1-2.

Computer telephony integration, available at http://en.wikipedia.org/wiki/Computer_telephony_integration, Wikipedia, dated May 12, 2009, p. 1-4.

Provisioning Protocol-Specific Interfaces, available at www.cisco.com, Cisco, dated 2007, p. 1-2.

Neuman, C., Hartman, S., Raeburn, K., RFC 4120, The Internet Society, dated Jul. 2005, p. 1-139.

Understanding DNSBL Filtering, Spamhaus, available at www.spamhaus.org, dated Oct. 25, 2007, p. 1-3.

Bryan, D., Matthews, P., Shim, E., Willis, D., Concepts and Terminology for Peer to Peer SIP, IETF, dated Jun. 2007, p. 1-26.

Freedman, M., Morris, R., Tarzan: A Peer-to-Peer Anonymizing Network Layer, dated 2002, pp. 1-14, ACM, Washington, D.C.

Tor: Overview, dated Mar. 2, 2009, pp. 1-5, The Tor Project, Inc., available at www.torproject.org.

Wang, X., Chen, S., Jajodia, S., Tracking Anonymous Peer-to-Peer VoIP Calls on the Internet, dated 2005, pp. 1-11, ACM, Alexandria, Virginia.

Ramasubramanian, V., Sirer, E., Perils of Transitive Trust in the Domain Name System, dated May 13, 2005, pp. 1-6, Cornell University, available at http://economics.library.cornell.edu.

Walsh, K., Sirer, E., Experience with an Object Reputation System for Peer-to-Peer Filesharing, dated 2006, pp. 1-14, USENIX Association.

Office Action, dated May 20, 2010, pp. 1-14, U.S. Appl. No. 11/780,975, U.S. Patent and Trademark Office, Virginia.

International Search Report dated Apr. 5, 2010, pp. 1-3, International Application No. PCT/US2010/022004, European Patent Office, The Netherlands.

Written Opinion dated Apr. 5, 2010, pp. 1-7, Application No. PCT/US2010/022004, European Patent Office, Germany.

Notice of Allowance, dated Sep. 14, 2010, pp. 1-6, U.S. Appl. No. 11/780,975, U.S. Patent and Trademark Office, Virginia.

Office Action dated Oct. 6, 2010, pp. 1-11, U.S. Appl. No. 12/370,384, U.S. Patent and Trademark Office, Virginia.

Office Action, dated Jan. 7, 2011, pp. 1-43, U.S. Appl. No. 12/367,930, U.S. Patent and Trademark Office, Virginia.

Office Action, dated Jan. 12, 2011, pp. 1-44, U.S. Appl. No. 12/495,615, U.S. Patent and Trademark Office, Virginia.

Office Action, dated Jan. 7, 2011, pp. 1-43, U.S. Appl. No. 12/495,595, U.S. Patent and Trademark Office, Virginia.

Office Action, dated Jan. 6, 2011, pp. 1-43, U.S. Appl. No. 11/780,941, U.S. Patent and Trademark Office, Virginia.

Office Action, dated Jan. 13, 2011, pp. 1-53, U.S. Appl. No. 12/495,639, U.S. Patent and Trademark Office, Virginia.

Office Action, dated Jan. 20, 2011, pp. 1-56, U.S. Appl. No. 12/608,484, U.S. Patent and Trademark Office, Virginia.

Office Action, dated Feb. 4, 2011, pp. 1-71, U.S. Appl. No. 12/608,545, U.S. Patent and Trademark Office, Virginia.

(56) References Cited

OTHER PUBLICATIONS

Office Action, dated Mar. 8, 2011, pp. 1-34, U.S. Appl. No. 12/370,384, U.S. Patent and Trademark Office, Virginia.
International Search Report, dated Nov. 4, 2010, pp. 1-3, International Application No. PCT/US2010/037459, European Patent Office, The Netherlands.
Written Opinion, dated Nov. 4, 2010, pp. 1-8, International Application No. PCT/US2010/037459, European Patent Office, The Netherlands.
Rosenberg, J. et al., RFC 5039—The Session Initiation Protocol (SIP) and Spam, dated Jan. 2008, pp. 1-27, available at www.rfc-editor.org/rfc/rfc5039.txt.
Rosenberg, J. et al., The Session Initiation Protocol (SIP) and Spam—draft-rosenberg-sipping-spam-00, dated Jul. 11, 2004, pp. 1-21, IETF, available at http://tools.ietf.org/html/draft-rosenberg-sipping-spam-00.
Cao, Feng et al., Providing Response Identity and Authentication in IP Telphony, dated 2006, pp. 1-8, IEEE Computer Society.
International Preliminary Report on Patentability, dated Jan. 26, 2010, pp. 1-7, International Application No. PCT/US2008/070259, International Bureau of WIPO, Switzerland.
Lack of Unity Action and Partial International Search, dated Mar. 3, 2011, pp. 1-6. International Application No. PCT/US2010/051820, European Patent Office, The Netherlands.
d'Heureuse, Nico et al., Protecting SIP-based Networks and Services from Unwanted Communications, dated 2008, pp. 1-5, IEEE.
Chiang, Hsia-Ling et al., A Study of Global Numbering Plan With Active Anti-Spit Capability on Voip, dated 2008, pp. 17-22, IEEE.
International Search Report, dated Mar. 18, 2011, International Application No. PCT/US2010/051822, European Patent Office, The Netherlands.
Office Action, dated Jun. 22, 2011, pp. 1-31, U.S. Appl. No. 11/780,941, U.S. Patent and Trademark Office, Virginia.
Office Action, dated Jun. 24, 2011, pp. 1-34, U.S. Appl. No. 12/608,545, U.S. Patent and Trademark Office, Virginia.
Office Action, dated Jun. 27, 2011, pp. 1-38, U.S. Appl. No. 12/367,930, U.S. Patent and Trademark Office, Virginia.
Office Action, dated Jun. 27, 2011, pp. 1-36, U.S. Appl. No. 12/495,615, U.S. Patent and Trademark Office, Virginia.
Office Action, dated Jun. 27, 2011, pp. 1-40, U.S. Appl. No. 12/495,639, U.S. Patent and Trademark Office, Virginia.
Office Action, dated Jun. 27, 2011, pp. 1-41, U.S. Appl. No. 12/608,484, U.S. Patent and Trademark Office, Virginia.
Office Action, dated Jun. 27, 2011, pp. 1-35, U.S. Appl. No. 12/495,595, U.S. Patent and Trademark Office, Virginia.
International Search Report, dated Jun. 29, 2011, International Application No. PCT/US2010/051820, European Patent Office, The Netherlands.
Notice of Allowance, dated Aug. 18, 2011, pp. 1-10, U.S. Appl. No. 12/370,384, U.S. Patent and Trademark Office, Virginia.
International Preliminary Report on Patentability, dated Aug. 9, 2011, pp. 1-7, International Application No. PCT/US2010/022004, International Bureau of WIPO, Switzerland.
Notice of Allowance, dated Apr. 7, 2011, pp. 1-17, U.S. Appl. No. 11/780,975, U.S. Patent and Trademark Office, Virginia.
Notice of Allowance, dated Jul. 28, 2011, pp. 1-9, U.S. Appl. No. 11/780,975, U.S. Patent and Trademark Office, Virginia.
Notice of Allowance, dated Oct. 5, 2011, pp. 1-8, U.S. Appl. No. 12/370,384, U.S. Patent and Trademark Office, Virginia.
Office Action, dated Nov. 3, 2011, pp. 1-41, U.S. Appl. No. 11/780,941, U.S. Patent and Trademark Office, Virginia.
European Office Action, dated Nov. 14, 2011, pp. 1-4, European Patent Application No. 08781931.4, European Patent Office, Germany.
Office Action, dated Jan. 5, 2012, pp. 1-41, U.S. Appl. No. 12/367,930, U.S. Patent and Trademark Office, Virginia.
Office Action, dated Jan. 23, 2012, pp. 1-41, U.S. Appl. No. 12/608,484, U.S. Patent and Trademark Office, Virginia.
Office Action, dated Jan. 23, 2012, pp. 1-41, U.S. Appl. No. 12/608,545, U.S. Patent and Trademark Office, Virginia.
Office Action, dated Jan. 23, 2012, pp. 1-39, U.S. Appl. No. 12/495,639, U.S. Patent and Trademark Office, Virginia.
Office Action, dated Jan. 25, 2012, pp. 1-48, U.S. Appl. No. 12/495,595, U.S. Patent and Trademark Office, Virginia.
Office Action, dated Jan. 26, 2012. pp. 1-51, U.S. Appl. No. 12/495,615, U.S. Patent and Trademark Office, Virginia.
International Preliminary Report on Patentability and Written Opinion, dated Jan. 12, 2012, pp. 1-8, International Application No. PCT/US2010/037459, International Bureau of WIPO, Switzerland.
Notice of Allowance, dated Feb. 16, 2011, pp. 1-11, U.S. Appl. No. 11/780,928, U.S. Patent and Trademark Office, Virginia.
Notice of Allowance, dated Feb. 22, 2012, pp. 1-11, U.S. Appl. No. 11/780,941, U.S. Patent and Trademark Office, Virginia.
Chinese Office Action, dated Feb. 29, 2012, pp. 1-8, Chinese Patent Application No. 200880025311.6, Chinese Patent Office, China.
Notice of Allowance, dated Mar. 30, 2012, pp. 1-11, U.S. Appl. No. 12/367,930, U.S. Patent and Trademark Office Virginia.
Notice of Allowance, dated Apr. 3, 2012, pp. 1-11, U.S. Appl. No. 12/608,484, U.S. Patent and Trademark Office, Virginia.
Notice of Allowance, dated Apr. 3, 2012, pp. 1-11, U.S. Appl. No. 12/495,615, U.S. Patent and Trademark Office, Virginia.
Notice of Allowance, dated Mar. 29, 2012, pp. 1-11, U.S. Appl. No. 12/608,545, U.S. Patent and Trademark Office, Virginia.
Notice of Allowance, dated Mar. 30, 2012, pp. 1-11, U.S. Appl. No. 12/495,639, U.S. Patent and Trademark Office, Virginia.
Notice of Allowance, dated May 25 2012, pp. 1-13, U.S. Appl. No. 12/495,595, U.S. Patent and Trademark Office, Virginia.
Jennings, C. et al., Verification Involving PSTN Reachability: Requirements and Architecture Overview, draft-jennings-vipr-overview-00, dated Apr. 1, 2011, pp. 1-42, IETF, available at http://tools.ietf.org/html/draft-jennings-vipr-overview-00.
Marias, G.F. et al, SIP Vulnerabilities and Anti-SPIT Mechanisms Assessment, Aug. 16, 2007, pp. 597-604, IEEE.
Seedorf, Jan, SIP Security: Status Quo and Future Issues, Dec. 27, 2006, pp. 1-5, 23rd Chaos Communication Congress.
Seedorf, Jan, Using Cryptographically Generated SIP-URIs to Protect the Integrity of Content in P2P-SIP, Jun. 2, 2006, pp. 1-16, Third Annual VoIP Security Workshop, Berlin, Germany.
Niccolini, Saverio, SPIT Prevention: State of the Art and Research Challenges, Jun. 2, 2006, pp. 1-37, Network Laboratories, NEC Europe Ltd., Heidelberg, Germany.
Materna, Bogdan, Threat Mitigation for VoIP, Jun. 2, 2006, pp. 1-12, Third Annual VoIP Security Workshop, VoIPshield Systems, Inc.
Hansen et al., Developing a Legally Compliant Reachability Management System as a Countermeasure Against SPIT, Jun. 2, 2006, pp. 1-19, Third Annual VoIP Security Workshop.
Office Action, dated Jan. 6, 2011, pp. 1-49, U.S. Appl. No. 11/780,928, U.S. Patent and Trademark Office, Virginia.
Office Action, dated Jun. 22, 2011, pp. 1-40, U.S. Appl. No. 11/780,928, U.S. Patent and Trademark Office, Virginia.
Office Action, dated Nov. 1, 2011, pp. 1-41, U.S. Appl. No. 11/780,928, U.S. Patent and Trademark Office, Virginia.
Chinese Office Action issued in Chinese Patent Application No. 201080001899.9, dated Jun. 3, 2012, pp. 1-5; State Intellectual Property Office of the People's Republic of China, Beijing, China.
Office Action, dated Mar. 5, 2013, pp. 1-11, Chinese Patent Application Serial No. 2010-80001900.8, State Intellectual Property Office, Beijing, China.

\* cited by examiner

USING PSTN REACHABILITY TO VERIFY VOIP CALL ROUTING INFORMATION

This application claims priority under 35 U.S.C. §120 to U.S. patent application Ser. No. 11/780,928, "USING PSTN REACHABILITY TO VERIFY VOIP CALL ROUTING INFORMATION" filed Jul. 20, 2007, the entire contents of which are hereby incorporated herein by reference.

TECHNICAL FIELD

This disclosure relates generally to Voice over Internet Protocol (VoIP).

BACKGROUND

Voice over Internet protocol (VoIP) systems manage the delivery of voice information over the Internet. VoIP involves sending voice information in digital form in discrete packets rather than using the traditional circuit-committed protocols of the public switched telephone network (PSTN). VoIP is also referred to as IP Telephony, Internet telephony, Broadband telephony, Broadband Phone, and Voice over Broadband. A major advantage of using VoIP is that it avoids the tolls charged by ordinary telephone service providers. As such, VoIP systems are becoming ever more common within enterprises.

A VoIP call typically involves a signaling session and a media session. The signaling can be accomplished using various protocols such as Session Initiation Protocol (SIP), H.323 Protocol, or any other suitable signaling protocols. SIP is an application-layer control (signaling) protocol that is used for creating, modifying, and terminating sessions with one or more participants. These sessions can include Internet telephone calls, multimedia distribution, and multimedia conferences. SIP clients use Transmission Control Protocol (TCP) or User Datagram Protocol (UDP) to connect to SIP servers and other SIP endpoints. H.323 defines the protocols that provide audio-visual communication sessions on any packet network; and is commonly used in VoIP and IP-based video-conferencing.

Media streams are sent using the Real-time Transport Protocol (RTP). RTP helps to ensure that packets get delivered in a timely way. Media streams also involve UDP packets, and are transmitted at regular intervals. Media streams are typically encoded using a speech compression algorithm.

Typically, a call agent handles VoIP call routing for VoIP clients. The call agent typically makes a VoIP call using a destination telephone number. This number can be associated with a client on the same call agent, in which case the call is sent directly to that client. Or, the number might be associated with a client associated with a different agent within the same enterprise. In that case, the call agent sends the call to that agent, using configured rules that define how to route the call. When users within the enterprise communicate with users outside of the enterprise, the call is terminated on a PSTN gateway and routed off to the PSTN. This, however, eliminates many of the benefits of VoIP.

Service providers are now beginning to offer "SIP Trunk" services, whereby an enterprise can connect their calls via a SIP link to the service provider instead of through an enterprise gateway. This technique has many of the same limitations as a direct gateway interconnect, since the service provider typically routes the call to a gateway. Furthermore, SIP trunks are not likely to be much cheaper than time-division multiplexing (TDM) trunks, because there is little business incentive for a service provider to make them more cost effective.

Within enterprises or groups of enterprises, two call agents may connect to each other directly over IP, without requiring an intermediate service provider for voice services. One solution for accomplishing this is to statically configure direct SIP or H.323 trunks between call agent or call manager instances in different enterprises. While this may work for small-scale closeknit communities, it becomes very burdensome for even a few dozen interconnected sites and limits its advantages to VoIP calls within the community. Ideally, VoIP should be as easily interconnected as email—any enterprise should just be able to connect to any other enterprise, without configuration.

DESCRIPTION OF EXAMPLE EMBODIMENTS

Overview

Figure 1:
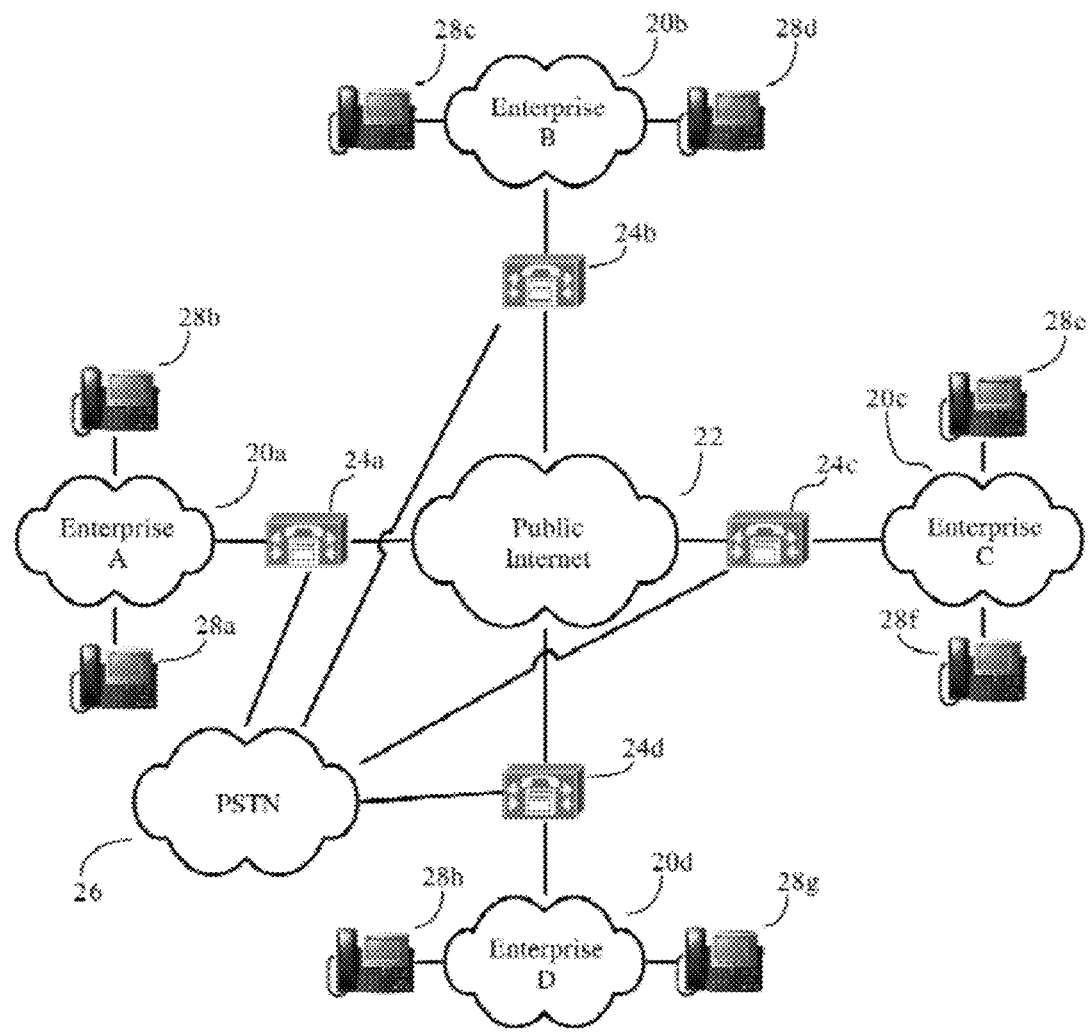
FIG. 1 illustrates example components in a Voice over Internet Protocol (VoIP) network and a Public Switched Telephone Network (PSTN) system.

Particular implementations facilitate the exchange and security of VoIP calls over public packet-based communications networks. According to particular implementations, the present invention enables a call agent to use the PSTN system to verify ownership of numbers at another call agent.

As described in further detail below, in one implementation, a call agent claiming ownership to one or more telephone numbers may modify a registry of VoIP call routing information with address blocks containing telephone numbers and/or prefixes in association with a network address of a call agent. This registry is accessible to multiple call agents across a network. The registry may be a maintained in a central repository or in a distributed system, such as a peer-to-peer (P2P) network, where each call agent is a peer operative to exchange VoIP call routing information with other peers.

The registry may include a hash-based access mechanism to protect unfettered access to the VoIP call routing information. For example, instead of each entry of the registry including a telephone number or prefix (or block of telephone numbers) stored unencrypted, the entry contains a hashed value of each telephone number or prefix. To create an entry in the registry, a call agent may hash each of its claimed telephone numbers and prefixes and place each into the registry. Similarly, an originating (calling) call agent, responsive to a call initiation message identifying a destination telephone number, may determine the IP address of a destination call agent by hashing the destination telephone number and looking it up in the registry. In one implementation, the originating call agent searches the registry for a matching entry, where a matching entry would contain an IP address corresponding to the destination call agent. As described in more detail below, the originating call agent may have the destination telephone number, while the hash in the registry may be of a prefix that covers the destination telephone number. Accordingly, in one implementation, if there is not a matching entry for the hashed destination telephone number, the originating call agent may strip the last digit of the number, hash it, and perform another search. The originating call agent may repeat this process until a match is found or until the number of remaining digits is reached to a predefined threshold number.

However, the usage of the registry alone is not sufficient for secure operation of the system. The principle challenge to solve is to be certain that the entries in the registry are correct. In particular, it must be verified that the call agent that has written an entry or series of entries into the registry is truly the "owner" of those numbers. Here, "ownership" implies the property that, had the call actually been routed over the PSTN, it would arrive at that same agent or an agent within the same enterprise. As described in further detail below, in one implementation, an originating call agent may validate ownership of a telephone number by making a PSTN call to the destination call agent claiming to own the telephone number. Both call agents record attributes of the PSTN call. PSTN call attributes may include, for example, a start time, an end time if applicable, a call length, caller ID, and other attributes of the call. Either during or after the call, the originating call agent transmits a request, over IP, for PSTN call attributes to the destination call agent. If the destination call agent had not received the PSTN call, it will not have access to these attributes. Therefore, if it can provide these attributes to the originating call agent, it can demonstrate its ownership of the destination number. Depending on whether the destination call agent responds successfully, the originating call agent may apply an appropriate policy (e.g., store data associated with the verified call agent in the cache so that, for example, future calls can be connected immediately over VoIP, continue the PSTN call, etc.).

As described in further detail below, in one implementation, a destination call agent may verify the caller identification (ID) provided in a VoIP call signaling message sent by an originating call agent by validating the originating call agent against the cache or against the registry. In one implementation, the destination call agent may also verify the caller ID provided by the originating call agent by making a PSTN call to the number provided in the caller ID, where both call agents record the PSTN call attributes. Either during or after the call, the destination call agent transmits, over IP, a request for PSTN call attributes to the originating call agent. Depending on whether the originating call agent successfully responds to the request, the originating call agent may apply an appropriate policy (e.g., display the caller ID or permit the call for a verified call agent, etc.).

Example Embodiments

FIG. 1 illustrates an example network environment including a packet-switched communications network, supporting a Voice over Internet Protocol (VoIP) network, and a Public Switched Telephone Network (PSTN) system. In a specific embodiment of the present invention, the system includes enterprise networks 20a, 20b, 20c, and 20d that are operably coupled to a public Internet 22. The enterprise networks 20a, 20b, 20c, and 20d include respective call agents 24a, 24b, 24c, and 24d that are also operably coupled to a PSTN network 26. Each of enterprise networks 20a, 20b, 20c, and 20d are also operably coupled to one or more clients 28a-28h over the respective enterprise networks.

In one implementation, a call agent 24 may be an IP-PBX hosting call manager application, such as Cisco Call Manager (CCM), or any node hosting VoIP call manager functions. In another implementation, the call agent 24 may be an IP to IP gateway, such as a Session Border Controller (SBC) or Back-to-Back User Agent (B2BUA) connected to an existing TDM PBX, IP PBX, or other voice or voice over IP equipment. In another implementation, call agent 24 may be a firewall or border router at the edge or near the edge of the IP network 20. In one implementation, the call agents 24 may perform the processes described below, including functionalities directed to accessing registries of VoIP call routing information, making and receiving PSTN and VoIP calls and verifying other call agents. In particular implementations, call agents 24 may possibly have media gateway functionalities. In one implementation, a client 28 may be a phone operably connected to a network or directly to a call agent 24.

A call agent 24, when implemented on an IP-PBX, may switch calls between VoIP clients 28 on local lines while allowing all VoIP clients 28 to share a certain number of external PSTN network phone lines. The call agent 24 may also switch calls between a VoIP user and a traditional telephone user, or between two traditional telephone users in the same way that a conventional PBX does.

In particular implementations, the call agents 24 are operative to connect through the public internet 22 to form a P2P network for the purpose of maintaining a distributed registry of VoIP call routing information. In another implementation, call agents 24 all access a centralized or hierarchically structured common store, such as a database Domain Name System (DNS) servers for the purpose of storing and accessing the registry of VoIP call routing information. In one implementation, each call agent 24 is operable to maintain and access a cache, where the cache may be a local cache that resides in the call agent 24 or may be external to but accessible by call agents 24 of the P2P network. As discussed below, the local cache contains validated VoIP call routing information. Each call agent 24 is also operable to access a registry of VoIP call routing information. A given call agent 24 may access its cache or the registry to store or to look up VoIP call routing information of other call agents to make VoIP calls, as well as to verify other call agents.

A PSTN 26 is a circuit-switched network, comprising all or a subset of the world's public circuit-switched telephone networks. The PSTN may include partial fixed-line analog telephone systems, and partial digital telephone systems, as well as mobile telephone systems. An advantage of utilizing the PSTN 26 is that it may operatively connect many enterprises in the world that have PSTN connectivity and possibly caller ID and connected party ID.

Figure 2:
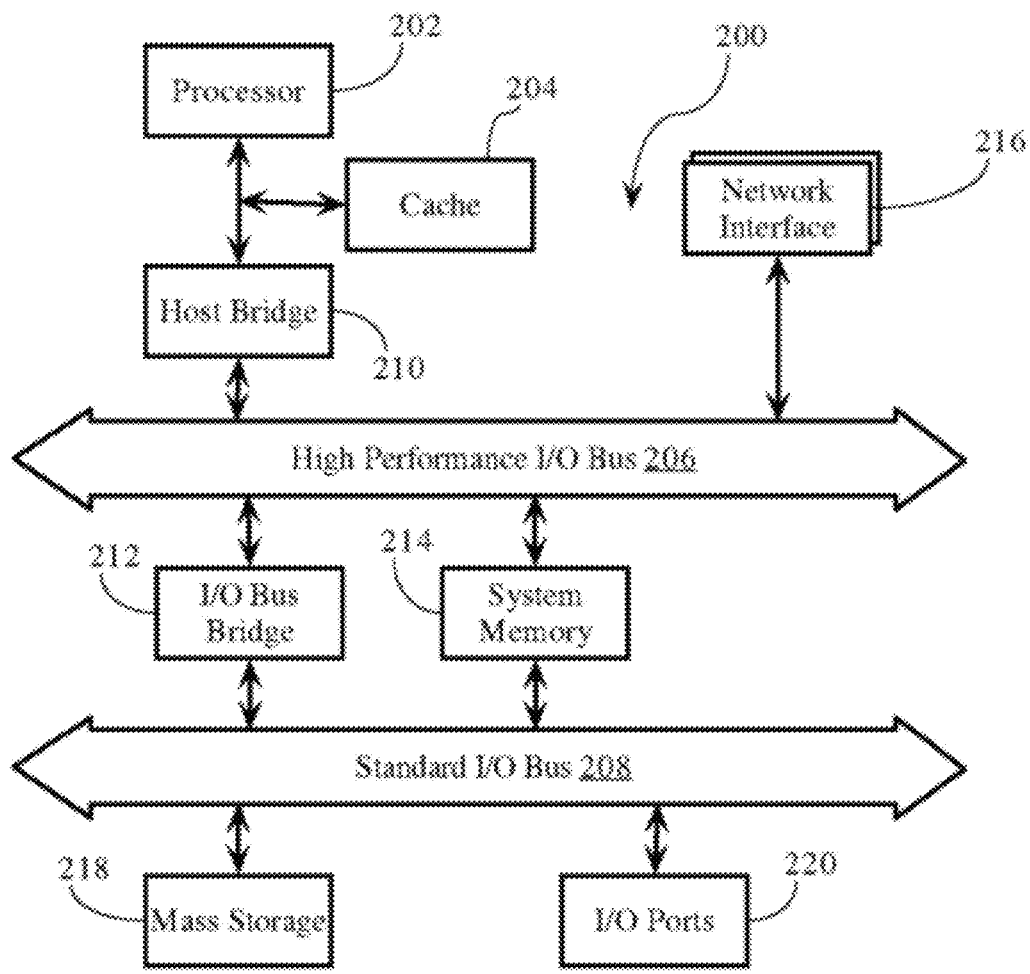
FIG. 2 illustrates for didactic purposes a hardware system, which may be used to implement an Internet Protocol Private Branch Exchange (IP-PBX) or other host of call agent or call manager functionality.

FIG. 2 illustrates for didactic purposes a hardware system 200, which may be used to implement a call agent host, such as an Internet Protocol Private Branch Exchange (IP-PBX). In one implementation, hardware system 200 comprises a processor 202, a cache memory 204, and one or more software applications and drivers directed the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures, and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

As discussed above, in one embodiment, the operations of the gateway or call manager described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, other embodiments of the present invention may be used with other suitable operating systems, such as the Apple Macintosh Operating System, available from Apple Computer Inc. of Cupertino, Calif., UNIX operating systems, LINUX operating systems, and the like.

In one embodiment, VoIP call routing information is maintained in a registry accessible to one or more call agents 24. In one implementation, the registry may be discoverable and publicly accessible. In one embodiment, the VoIP call routing information may include a set of entries, each including a telephone number or a prefix that represents a range of telephone numbers (or a set of telephone numbers or prefixes). For example, a given enterprise may own the telephone number +1-408-876-5432 and an address block of telephone numbers +1-973-952-5000 through +1-973-952-5999. As such, the call agent 24 of the enterprise may create two entries and would register, for each, a mapping that associates its identity with the number or prefix. In one implementation, the key for the mapping is the number or prefix of the number, including the digits only. In the example above, one key would be 14088765432, and the other would be 19739525. As such, in one implementation, each call agent may register blocks of telephone numbers that it owns by treating the prefix as a number and entering it in the registry. The identity information may include a network address (e.g., IP address, port number, hostname, etc.) or any other type of information that identifies a call agent.

In one embodiment, participation in the P2P network may require the call agent to have a predefined minimum number (e.g., a few dozen) of TCP connections to other nodes in the network. Those connections may be established dynamically, with the peers learned through the P2P protocols. In one implementation, registration into the P2P network may involve running an algorithm to select a peer to which a write operation should take place. That peer, in turn, passes the write onto another peer, and so on. This results in the data being stored and distributed across the call agents participating in the P2P network.

As discussed above, the registry of VoIP call routing information may include a hash-based mechanism protecting against unfettered access to the registry. That is, the telephone numbers or prefixes in the registry entries are hashed values. To store an entry in the registry, a call agent may first hash its associated phone number or prefix before storing it in the registry in association with its identity. The call agent may hash the telephone number or prefix using any suitable hash algorithm, such as MD5 and SHA1. Generally, a strong hash function should be used to ensure that the hashed value is unique to a given telephone number or prefix. By hashing the prefix or phone number, a given call agent may advertise number blocks in a secure manner. For example, using hashed telephone numbers or prefixes prevents telemarketers, spammers and spitters (VoIP spammers) from simply collecting telephone numbers from the registry. A user would need to know the correct telephone number first before attempting a successful search of the registry for VoIP call routing information. Otherwise, it would be computationally expensive (because of the computing resources required to compute the hash) to attempt to learn a significant amount of the VoIP call routing information maintained in the registry by repeatedly selecting a telephone number or prefix, computing a hash value and looking it up against the registry.

Topologically, the registry of VoIP call routing information may be maintained in a variety of ways. In one implementation, the registry may be maintained using a P2P network. The P2P network may be made up of all or some of the call agents in the system, or the registry can be maintained in a different P2P network, accessed by all of the call agents in the system.

When a P2P network is utilized, each node in the P2P network (which may be the call agents), will end up maintaining a subset of the information in the registry, depending on the P2P protocols that are in use. Any suitable P2P protocol or technique may be used, including Chord, CAN, Bamboo, Kademlia, and so on.

In some embodiments that utilize a centralized registry system, a central server may maintain the registry, where the registry may be a central repository accessible by one or more call agents. In one embodiment, a given call agent may send a phone number or prefix to a central data store, and the central data store will store it. Other call agents may query the central data store, and retrieve the mapping from the phone number to the identity of the call agent. In another embodiment, the central registry may hash the phone number or prefix and store the hashed phone number or prefix in the registry.

In some embodiments that utilize a hierarchical registry system, such as the domain name system (DNS), a given call agent may transform the phone number or prefix into a hierarchical identifier, for example, by utilizing a telephone number mapping protocol, such as the Electronic Numbering (ENUM) protocol defined by the IETF in RFC 2916. The call agent may then use this identifier to write the VoIP call routing information into the hierarchical system at the appropriate location. The servers in the hierarchy may be the same as the call agents, or different. If the DNS is used as the hierarchical system, this may be a public DNS or a private DNS.

In some embodiments, a given call agent may receive a telephone number in a call initiation message from an originating client or an originating call agent, and then use the telephone number to lookup VoIP call routing information in the registry. In one embodiment, the call agent may search the registry for each of the N−1 prefixes of the N-digit destination number. Searches may be based on exact matches, as opposed to hierarchical matches. In other words, only one address block should be found, and if more than one address block is found, the most specific one is used. Assuming there is a matching entry in the registry, the identity of the terminating call agent for that number or number block (which includes the IP address and port number of the destination call agent) that was found may be cached to avoid queries in the future.

Figure 3:
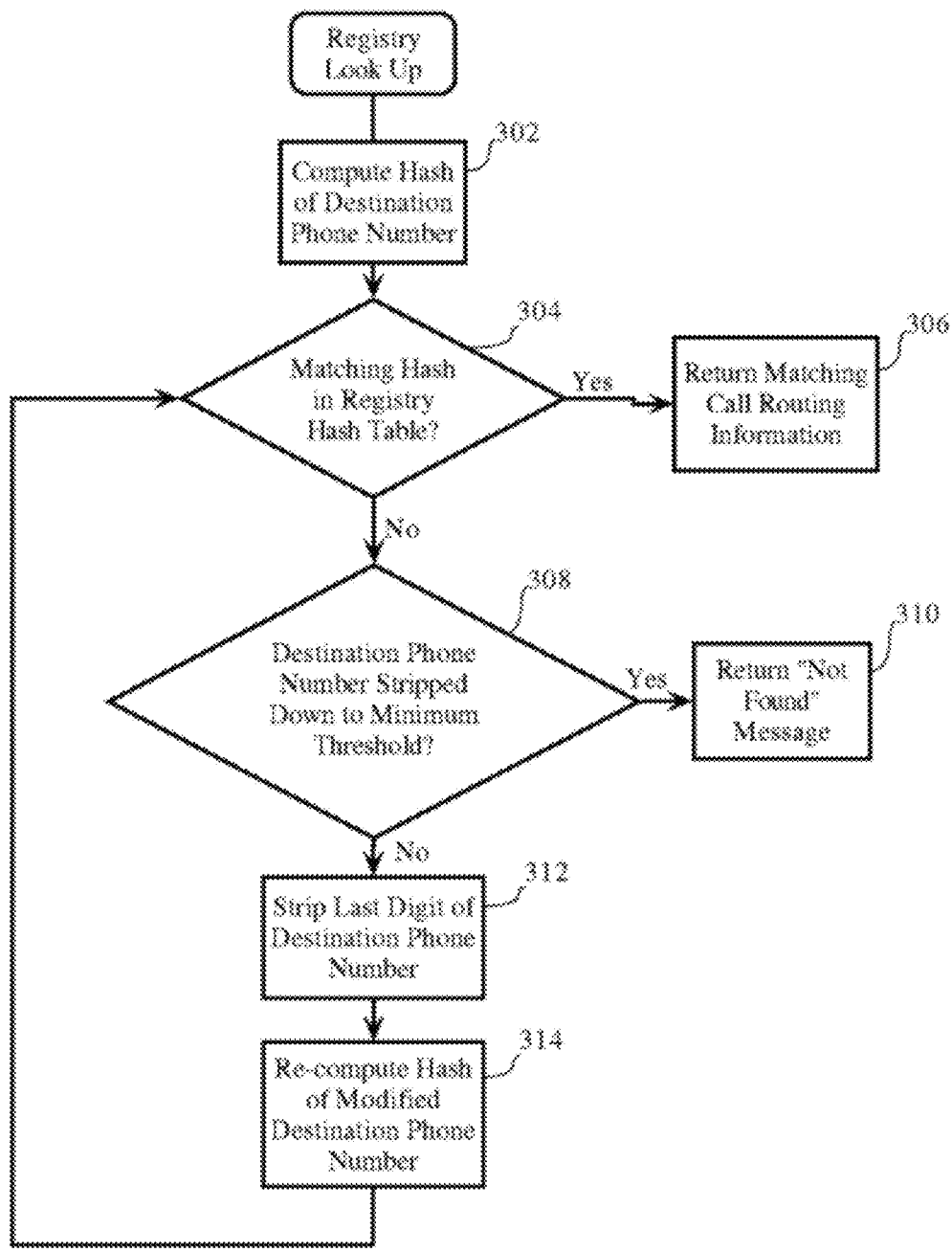
FIG. 3 illustrates an example process flow implemented at an originating call agent and associated with looking up an address block in a registry of VoIP call routing information.

In particular embodiments, where the registry stores hashed telephone numbers or prefixes, a look up process implemented on a call agent may perform the following operations in order to look up VoIP call routing information. FIG. 3 illustrates an example process flow implemented at a call agent directed to looking up VoIP call routing information in the registry. Responsive to some event (such as receiving a call initiation message identifying a telephone number), the look up process computes a hash of an identified telephone phone number (302). The look up process then accesses the registry and determines if there is a matching entry, or specifically, if the hashed telephone number matches (based on an exact string match) any hashed numbers in the registry (304). If so, VoIP call routing information corresponding to the matching entry is returned (306) and possibly used in some other process implemented by the call agent. For example, in one embodiment, the IP address of the destination call agent corresponding to the telephone number may be used to route a VoIP call.

If there is no matching entry, the look up process determines if the telephone number is stripped to a minimum threshold number of digits (308). In one embodiment, the minimum threshold may be a predefined number of digits. For example, the minimum threshold number may be 1 digit (e.g., the smallest country code possible). If the telephone number is stripped to a minimum threshold number of digits, the look up process returns a "not found" message (310). The call agent 24 may respond to this message in a variety of manners depending on the context. For example, in one implementation, an originating call agent may attempt to make a PSTN call or may deny the call, optionally notifying the originating client of the call denial and optionally providing a reason for denying the call.

If the destination phone number is not stripped to a minimum threshold number, the look up process strips the last digit of the telephone number (312). The originating call agent then re-computes the hash of the modified telephone number (314) and determines if the re-computed hashed telephone number matches any hashed telephone numbers in the registry (304). The call agent may continue this process until a matching entry is found or until the destination phone number has been stripped down to the minimum threshold number.

This process provides security to the system, because without a legitimate phone number, it would be computationally expensive to acquire phone numbers. In one embodiment, policies may be applied to detect suspicious nodes that transmit queries that result in greater than a threshold number of failures over a sliding window of time.

As described in more detail below, a given call agent may use the facilities of a PSTN to validate VoIP call routing information in the registry. For example, a call agent may verify that another call agent can legitimately claim ownership of a telephone number it wrote into the registry. Here, "ownership" may imply the property that, had the call been made over the PSTN, the call would have been routed to the call agent which wrote the entry into the registry, or if not that call agent, another call agent under the same administrative control. For example, a call agent, responsive to an identified telephone number, may make a PSTN call to that telephone number over PSTN 26. Generally, if the call agent claiming ownership of the destination telephone number is authentic, it will receive the PSTN call over PSTN 26 and will thus have an opportunity to record one or more attributes of the PSTN call, such as start time, end time, calling party identifier, and the like. The PSTN call attribute information can be used as a shared secret to allow the first call agent to validate the other call agent. As described in more detail below, verification of a call agent may occur during or after a PSTN call.

In the implementation described below, a given call agent may store verified VoIP call routing information in a local cache. The call agent, responsive to a call initiation message identifying a destination telephone number, may selectively place a PSTN or VoIP call to a given destination telephone number depending on the presence, or absence, of validated VoIP call routing information in the cache that corresponds to the destination telephone number. Matching validated routing information in the cache generally means that the terminating call agent has been verified. The originating call agent may then place a VoIP call by transmitting a call initiation message to the terminating call agent. If no validated match is found in the cache, but the number is in the cache as a consequence of a previous query to the registry, the call agent may place a PSTN call and validate the call agent. If no match is found in the cache at all, the call agent may query the registry for the number as described above, in addition to placing a PSTN call.

Figure 4:
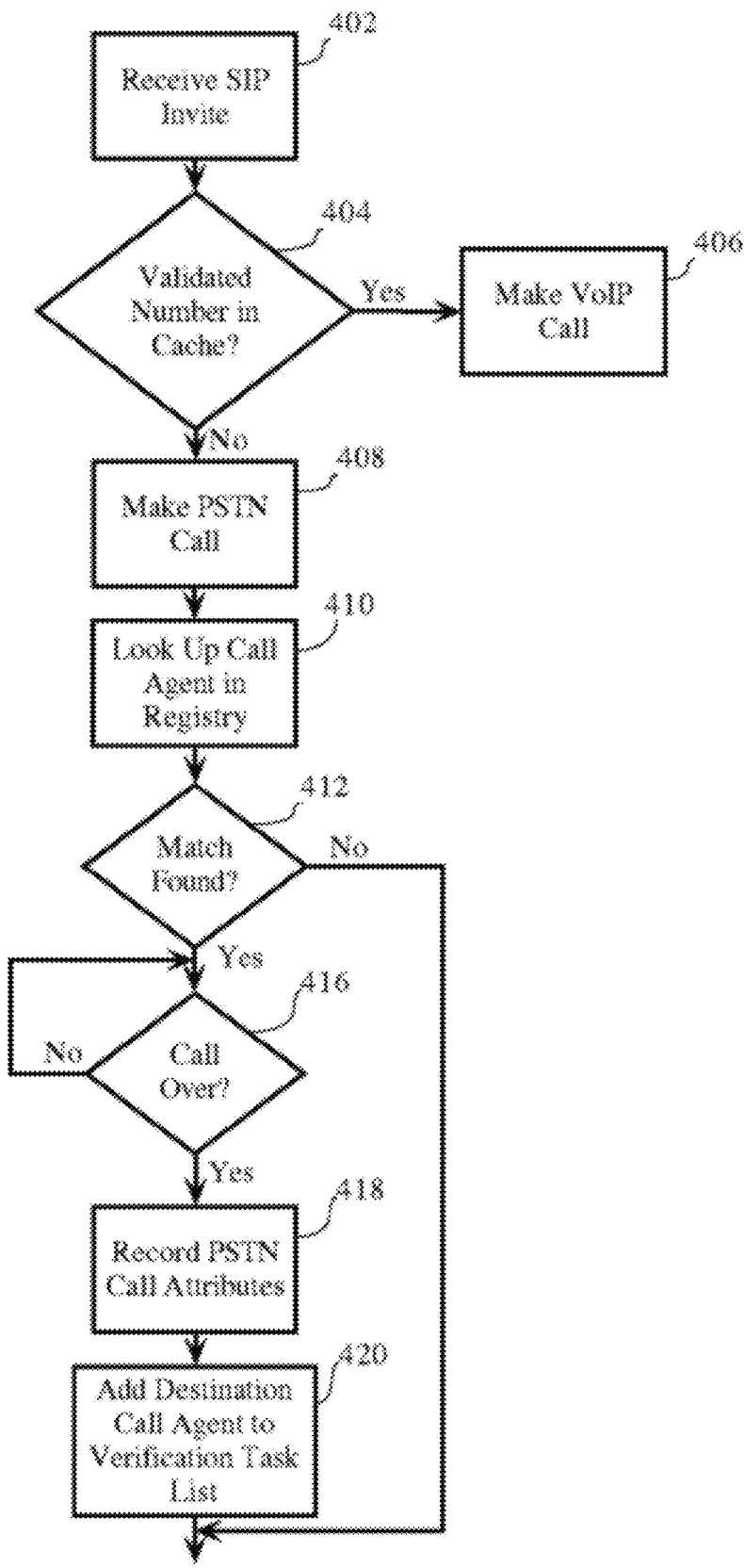
FIG. 4 illustrates an example process flow implemented at an originating call agent to determine whether to make a PSTN or VoIP call in response to a call initiation message.

FIG. 4 illustrates an example process flow implemented at an originating call agent directed to selectively placing a PSTN or VoIP call responsive to a call initiation message from a calling node. As FIG. 4 shows, the process begins when the originating call agent (e.g., call agent 24*a*) receives a call initiation message, such as a SIP invite, from an originating (calling) node (e.g., client 28a) (402). In one embodiment, the call initiation message includes a destination telephone number.

The originating call agent accesses its cache to determine if there is a matching validated cache entry, whereby the cached address block is associated with the destination number, and the destination number has been validated previously (404). If there is a matching validated entry in the cache, the originating call agent makes a VoIP call, transmitting signaling messages to the terminating call agent associated with the matching address block in the local cache (406). This signaling message can be sent directly to the destination call agent, or can be sent through intermediate servers or providers.

If there is no matching validated address block in the cache, the originating call agent makes a PSTN call to the destination telephone number (408). As FIG. 4 shows, the originating call agent may also look up, using the telephone number, the terminating call agent in the registry (408), if the destination number is not in the cache at all. More specifically, in one embodiment, the originating call agent may use the destination phone number to look up VoIP call routing information of the destination call agent in the registry (see Section C, above). If a matching entry is found (412), the originating call agent may record one or more attributes of the PSTN call to be used in a subsequent verification process. In the implementation shown, the originating call agent, after the PSTN call ends (416), records one or more PSTN call attributes in a data store (e.g. a called-out database) (418), and adds the terminating call agent to a verification task list (420). In one implementation, the data store may be a temporary data store that stores the information for a period of time, or it may be a database with persistent storage. In another implementation, the PSTN call attributes can be recorded for every call, and then the registry can be queried as part of the procedures followed when executing the verification task list.

A variety of PSTN call attributes can be stored. In one implementation, the PSTN call attributes may include a PSTN call start time, a PSTN call stop time, call length (e.g., how long the call lasted), a caller ID of the calling client, and any other information that the originating VoIP network may be used to verify that the destination received the PSTN call. Other PSTN call attributes may include signatures of the voice data as computed by the originating and terminating gateways. For example, the call agents may compute the amount and start times of silent periods during a call, or a spectral signature of the voice data during the call. Other PSTN call attributes may include a sequence of DTMF tones that the originating gateway may transmit during some point in the call (e.g., just prior to call termination).

One advantage of the implementations describe herein is that they may be used with telephone numbers. Another advantage is that implementations described herein are undetectable by service providers. Because enterprises may still make PSTN calls, implementations described herein may reduce the volume of such PSTN calls.

Furthermore, other implementations are possible. For example, even if matching VoIP call routing information is found in the cache, the originating call agent (according to some randomized or other process) may nevertheless select the entry for re-validation, causing the call agent to make a PSTN call and to add the call agent to a verification list. Still further, call agent may apply an aging algorithm to its cache to flush old entries.

Figure 5:
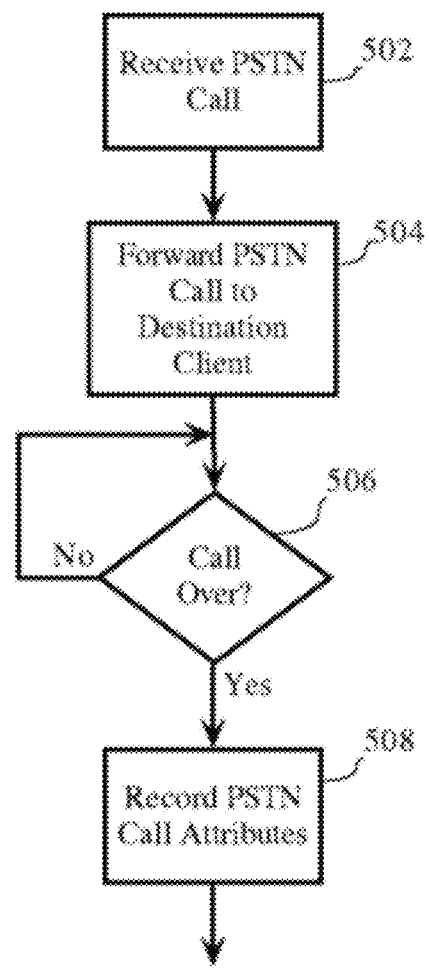
FIG. 5 illustrates an example process flow implemented at a destination call agent responsive to receiving a PSTN call.

FIG. 5 illustrates an example process flow implemented at a destination or terminating call agent directed to recording one or more attributes associated with a received PSTN call. To allow for verification, a terminating gateway may record one or more attributes of a PSTN call in order to successfully answer queries from the originating call agent. As FIG. 5 illustrates, the destination call agent receives a PSTN call (502) and then forwards the PSTN call to the destination client (504). After the call ends (506), the destination call agent records the PSTN call attributes in a data store (e.g. a called-in database) (508). In one implementation, the data store may be a temporary data store that stores the information for a period of time. The foregoing section identifies example PSTN call attributes that the terminating call agent may record.

If the originating call agent performs the verification after the PSTN call, the originating call agent may perform the verification at various times depending on the specific implementation. For example, the originating call agent may perform verification immediately after the PSTN call. In other implementations, the originating call agent may verify multiple destination call agents in a batch process run at off-peak periods. In one implementation, the originating call agent may verify the destination call agent at a random time after the call is completed. The originating call agent may perform one or more verification operations upon a triggering event such as when receiving a new call initiation message.

As described in more detail below, the verification may be a knowledge-based verification, where the originating call agent queries the destination call agent for PSTN call attributes corresponding to one or more prior PSTN calls. The PSTN call attributes may be conceptualized as "shared secrets" that only those two call agents would know.

Figure 6:
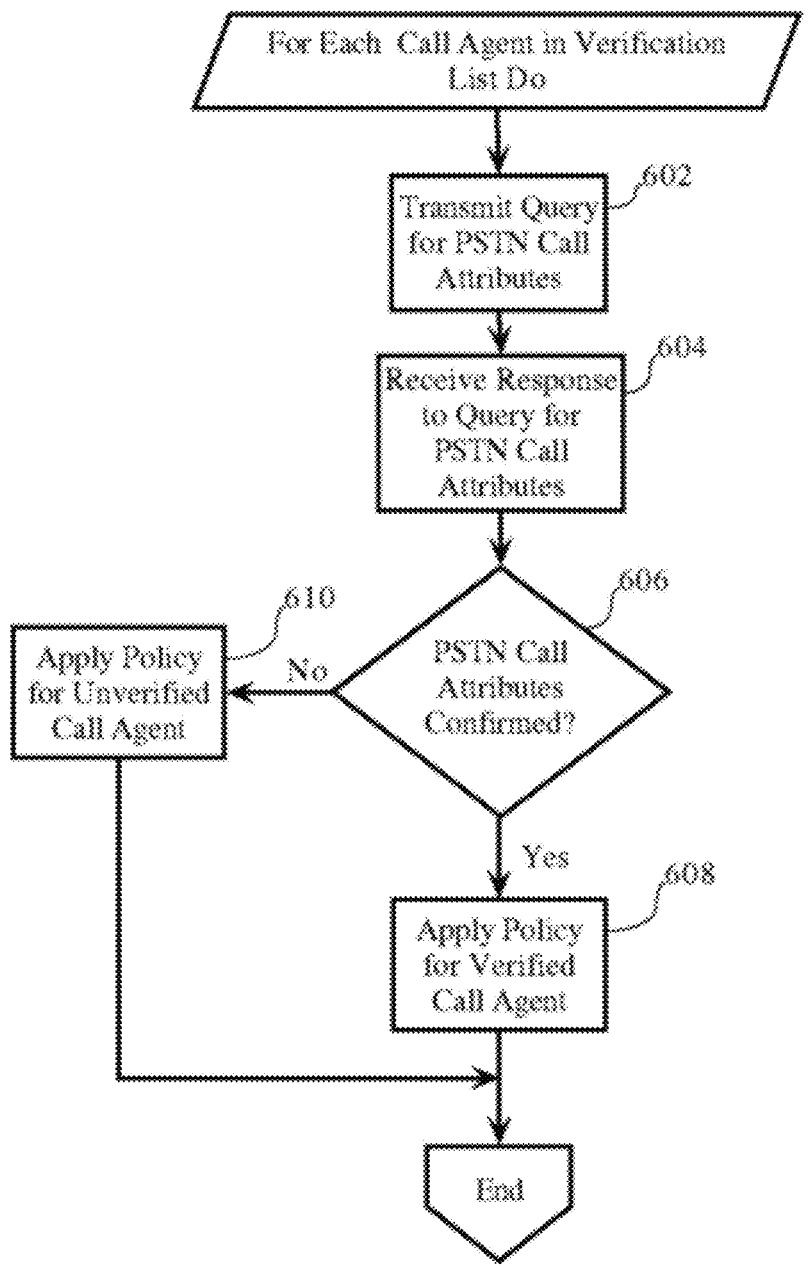
FIG. 6 illustrates an example process flow implemented at an originating call agent and associated with verifying a destination call agent.

FIG. 6 illustrates an example process flow implemented at the originating call agent and associated with verifying the destination call agent. As FIG. 6 shows, for each destination call agent in the verification list, the originating call agent transmits a query for PSTN call attributes to the destination call agent (602). The query may be transmitted over a packet-based communications network using the IP address and port of the destination call agent learned from the registry.

The call agents may communicate according to a variety of different protocols. For example, in one implementation, the "called-in" database maintained by a destination call agent may be accessible to a verifying call agent by using a directory access. The originating call agent may send a query using the destination phone number as a key, and the terminating agent would return the recorded PSTN attributes for calls with that destination phone number. Any number of protocols can be used for this purpose, including standard database and directory protocols, such as LDAP and SQL, or HTTP queries, SOAP queries, or any other suitable technology for querying for a piece of data and getting a response.

In an alternative implementation, an actual authentication protocol can be used to improve security. In this implementation, the PSTN call attributes are mapped to a username and password, and then a traditional authentication or login protocol can be used to verify the data. For example, the user name may be the destination number and start time of the PSTN call, and the password may be the stop time of the PSTN call. As another example, the username can be the destination number and a random time in the middle of the call, and the password can be the start and stop times of the call. As another example, the username can be the destination number and caller ID, and the password can be the start time and stop time of the call. In one implementation, the PSTN call attributes may include information associated with the content of the PSTN call. For example, during a given PSTN call, both the originating and destination call agents may execute a silence detection algorithm to detect silence and talking. The VoIP may then generate a PSTN call signature or fingerprint based on the detected silence and talking patterns. This fingerprint or signature can be used as part of the username and/or password. For example, the username could be the destination number and start time of the call, and the password could be the fingerprint. Or, the username could be the destination number and signature over the first half of the call, and the password is the signature over the second half.

In one implementation, the PSTN call attributes may include a call signature or fingerprint. In one implementation, the originating call agent may execute frequency spectrum analysis or speech recognition algorithms to generate the call signature or fingerprint. In one implementation, the originating call agent may, prior to the end of the PSTN call, send a random string using dual-tone multi-frequency (DTMF) values that both call agents record. The call signature or fingerprint may then include the DTMF bits. In one implementation, the query may provide the destination call agent minimal information such as the call start time. Based on the limited information, the destination call agent may ascertain the appropriate information to provide.

When the originating call agent receives a response to the query for PSTN call attributes (604), the originating call agent determines if the PSTN call attributes are confirmed (606). In one implementation, the PSTN call attributes are confirmed if the PSTN call attributes in the response from the destination call agent match the PSTN call attributes that the originating call agent stored in the "called out" database. In one implementation, when an authentication or log-in protocol is utilized, the PSTN call attributes are confirmed if the log-in or authentication protocol succeeds. In one implementation, the validation may fail due to a given PSTN call being forwarded to an illegitimate call agent.

If the PSTN call attributes are confirmed, the originating call agent applies an appropriate policy for verified destination call agents (608). For example, the originating call agent mark the entry in the cache for this number as being validated, resulting in future VoIP calls subsequently being made to that call agent, as discussed above. That is, if the VoIP routing information is validated for the first time, the originating call agent will find a matching entry in the cache the next time, and will thus able to make a VoIP call to the now verified call agent. As such, no subsequent search to the registry would be necessary.

Furthermore, the verifying call agent may establish a connection to the verified call agent for routing of VoIP call initiation messages. In one implementation, once a Transmission Control Protocol (TCP)/Transport Layer Security (TLS) connection is established, the originating call agent may send an SIP invite directly to the destination call agent. In one implementation, a given call agent may maintain multiple TCP/TLS connections up to a predefined number (e.g., 1,000 connections), after which the call agent may terminate an inactive or the least active connection.

If the PSTN call attributes are not confirmed, the originating call agent applies an appropriate policy for unverified destination call agents (610). For example, the originating call agent may log the verification failure in the cache, generate an alert message, add the call agent to a black list and the like, etc.

Implementations of the verification process may be optimized in a variety of ways. In one implementation, even if a given phone number or prefix is stored/validated in the cache, the verification may be augmented to cause a revalidation. For example, in one implementation, the originating call agent may randomly select some calls to re-verify that the destination call agent still owns the particular phone number of phone number block. In one implementation, the originating call agent may re-verify a predefined percentage of the calls (e.g., 5%) or a random number of calls. In another implementation, the call agent may timeout the validation after a configured period of time, for example, one month, so that re-verification is performed once a month.

In another optimization, when a particular number in a block has been verified, other numbers in that same block can also be considered verified. For example, if number A and number B within a block have been verified, the call agent can consider all numbers between A and B within that block to also be verified. In one implementation, this automatic verification can happen only when numbers A and B are close to each other, for example within 1000 numbers.

In another implementation, the shared secret may be defined based on the last N PSTN calls, improving the security of the mechanism. In one embodiment, instead of basing the PSTN call attributes on the last N calls between any two telephone numbers in a given block, the PSTN call attributes may be based on the last N calls between specific telephone numbers. In one implementation, if the originating call agent may validate a predefined number or predefined percentage of telephone phone numbers of a given address block (e.g., 2 out of 50 telephone numbers, or 4%), the originating call agent may accept the remaining telephone numbers of the address block for future calls.

In one implementation, if the destination call agent is verified before the PSTN call ends, the originating call agent may optionally permit the PSTN call to continue even with the successful verification. As such, the VoIP call may be used for enhanced features on top of the voice portion of the calls (e.g., the PSTN call). For example, the originating call agent may use the PSTN call for voice and use the VoIP call for enhanced features such as video, sound, presence, Instant Messaging (IM), and/or data applications.

Accordingly, implementations provide advantages such as preventing call agents from claiming ownership to a telephone number that they actually do not own. Also, implementations do not require any special PSTN configurations.

Figure 7A:
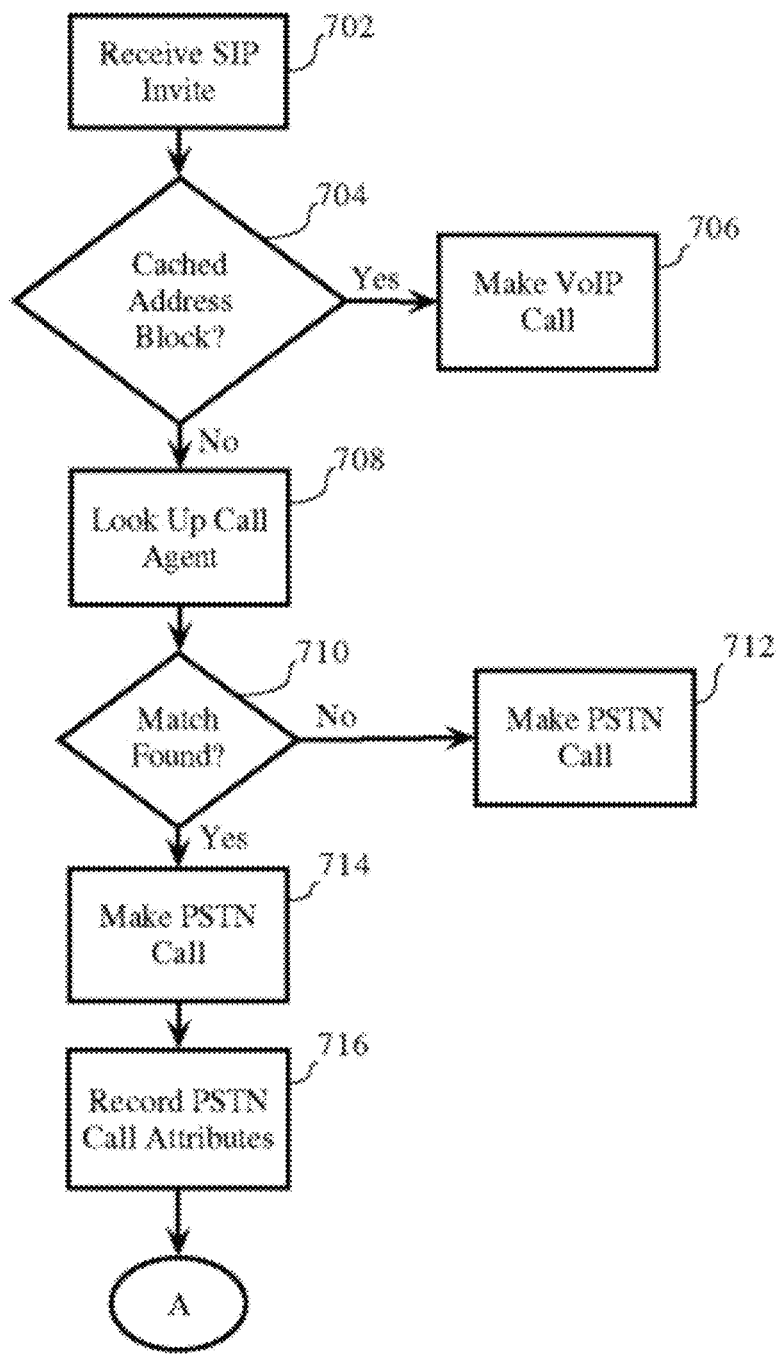
FIGS. 7A and 7B illustrate an example process flow implemented at an originating call agent and associated with verifying a destination call agent during a PSTN call.
Figure 7B:
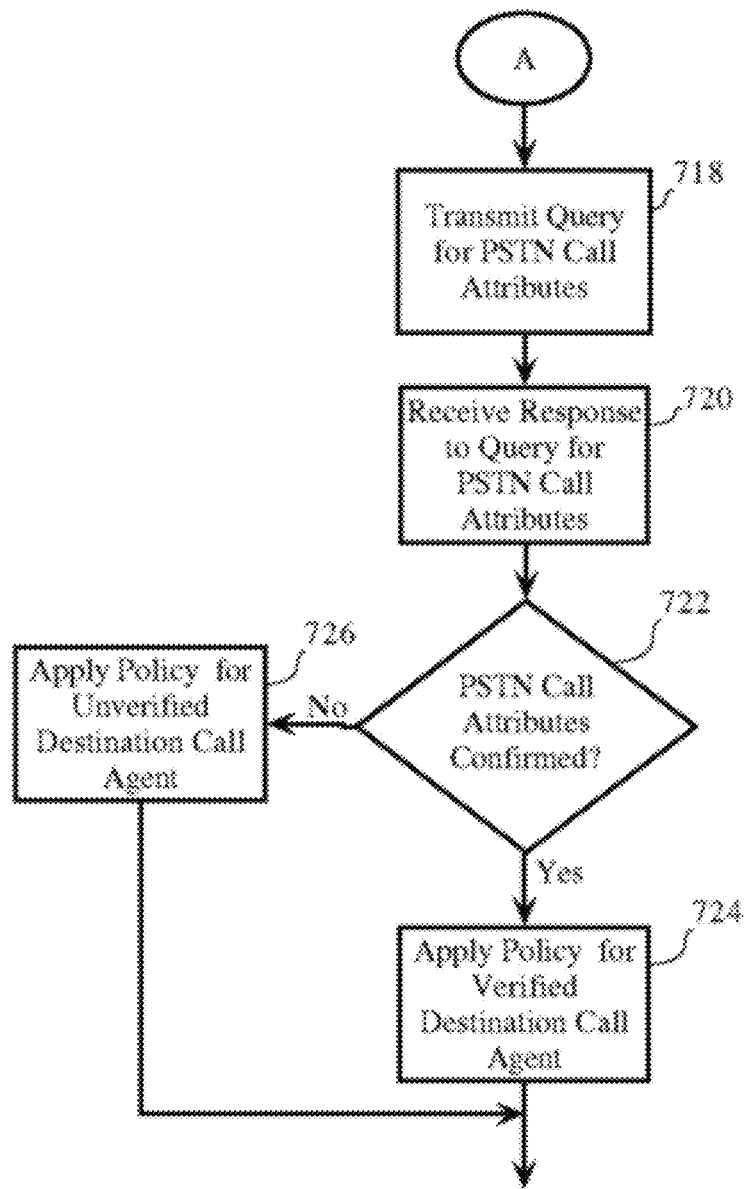

FIGS. 7A and 7B illustrate an example process flow implemented at the originating call agent directed to verifying the destination call agent during a PSTN call. As FIG. 7A shows, the process begins when the originating call agent receives a call initiation message such as a SIP invite from an originating client (702). In one embodiment, the call initiation message includes a destination telephone number.

The originating call agent accesses its cache to determine if there is a validated matching entry with an address block associated with the destination number (704). If so, the originating call agent makes a VoIP call (706).

If there is not a matching validated entry in the cache, the originating call agent looks up the destination call agent in the registry (708). If a match is not found (710), the originating call agent makes a PSTN call (712).

If a match is found (710), the originating call agent still makes a PSTN call (714) and also performs the following steps. The originating call agent records the PSTN call attributes in a data store (e.g. a called-out database) (716). As described above, in one implementation, the data store may be a temporary data store that stores the information for a period of time. In one implementation, the PSTN call attributes may include a PSTN call start time, a caller ID of the destination client, voice signature information (such as spectral analysis or silence/activity periods), DTMF, and any other information that the originating call agent may use to verify that the destination call agent is connected during the PSTN call.

Referring to FIG. 7B, while the PSTN call is still in progress, the originating call agent transmits a query for PSTN call attributes to the destination VoIP (718). In particular implementations, the query may request that the destination call agent provides similar information as the query described above in connection with step 602 of FIG. 6, except that the PSTN call attributes would not include a call stop time or a call length, as the PSTN call would still be in progress.

In one implementation, when the destination call agent receives a PSTN call, the destination call agent forwards the PSTN call to the destination client, and records the PSTN call attributes in a data store (e.g. a called-in database). Upon receiving the query for PSTN call attributes, the destination call agent sends a response. When the originating call agent receives the response to the query for PSTN call attributes (720), the originating call agent determines if the PSTN call attributes are confirmed (722). If the PSTN call attributes are confirmed, the originating call agent applies an appropriate policy for verified destination call agents (724). For example, the originating Call agent may cache the VoIP call routing information, so future calls may go over VoIP. Or, it may transfer the PSTN call in-progress to a VoIP call. If the PSTN call attributes are not confirmed, the originating Call agent applies an appropriate policy for unverified destination call agents (726). For example, the originating call agent may log the verification failure in the cache, generate an alert message, end the call, etc.

In one embodiment, if an attacker claims a telephone number that the attacker does not actually own, no call will ever be made to the attacker over VoIP, because the terminating call agent of the attacker would not be able to successfully respond to a query for PSTN call attributes, since the PSTN call would have gone to the actual owner of the telephone number.

In one embodiment, if an attacker claims ownership to a larger prefix than the attacker actually owns, the attacks may not be detected initially but would probably be detected. This is because some of the calls can be expected to be made over the PSTN, thereby assuring that the falsified numbers are eventually tried and detected. In one implementation, an enterprise may require that a PSTN call be made at least once to any particular destination telephone number. While this may cause more PSTN calls to be made, it would eliminate such attacks.

Because the registry is not used at the initial call setup time, any latency has no impact on call setup delays. Indeed, call setup times using implementations disclosed herein will be faster than even over the PSTN, because the originating call agent communicates directly with the destination call agent. In many cases, not even a Transmission Control Protocol (TCP) connection setup is required, because such a connection may have already been established and maintained as a consequence of a previous call to that terminating call agent.

However, in another implementation, when a PSTN call arrives at the terminating call agent, the terminating call agent holds the call and does not deliver it yet to the terminating client. Rather, it examines the caller ID from the PSTN call setup message, and queries the registry for this number. If a match is found, the terminating call agent further holds the call in anticipation of receiving a request to verify the PSTN call attributes. Once this validation has succeeded, the originating call agent can place a VoIP call, and the terminating call agent can reject the PSTN call and proceed with the VoIP call. This eliminates the need for a PSTN call to actually be completed, but increases call setup delays as a consequence.

Furthermore, implementations disclosed herein are fail-safe in that the originating call agent may make PSTN calls even when the destination call agent is verified against the cache or against the registry. In other words, even if a given originating call agent crashes and recovers, losing its cache, or if the registry is compromised in some way, or any of a number of problems occur, the worst case is that calls still get routed over the PSTN. As such, the end user experiences no disruption in service. Some P2P VoIP overlay network providers need to provide centralized servers that hand out user names within their network and hand out certificates. Because implementations described herein utilize telephone numbers that have already been issued to an enterprise, no such central services are required.

As described in more detail below, the cache maintained by the call agent and the registry may be used to verify caller ID information in received VoIP calls. For example, when a given destination call agent receives a call initiation message over a packet-based communications network (e.g., SIP invite) having an associated caller ID containing a phone number, the destination VoIP may verify the caller ID against the cache of the call agents and/or against the public registry. This provides two levels of validation.

Figure 8:
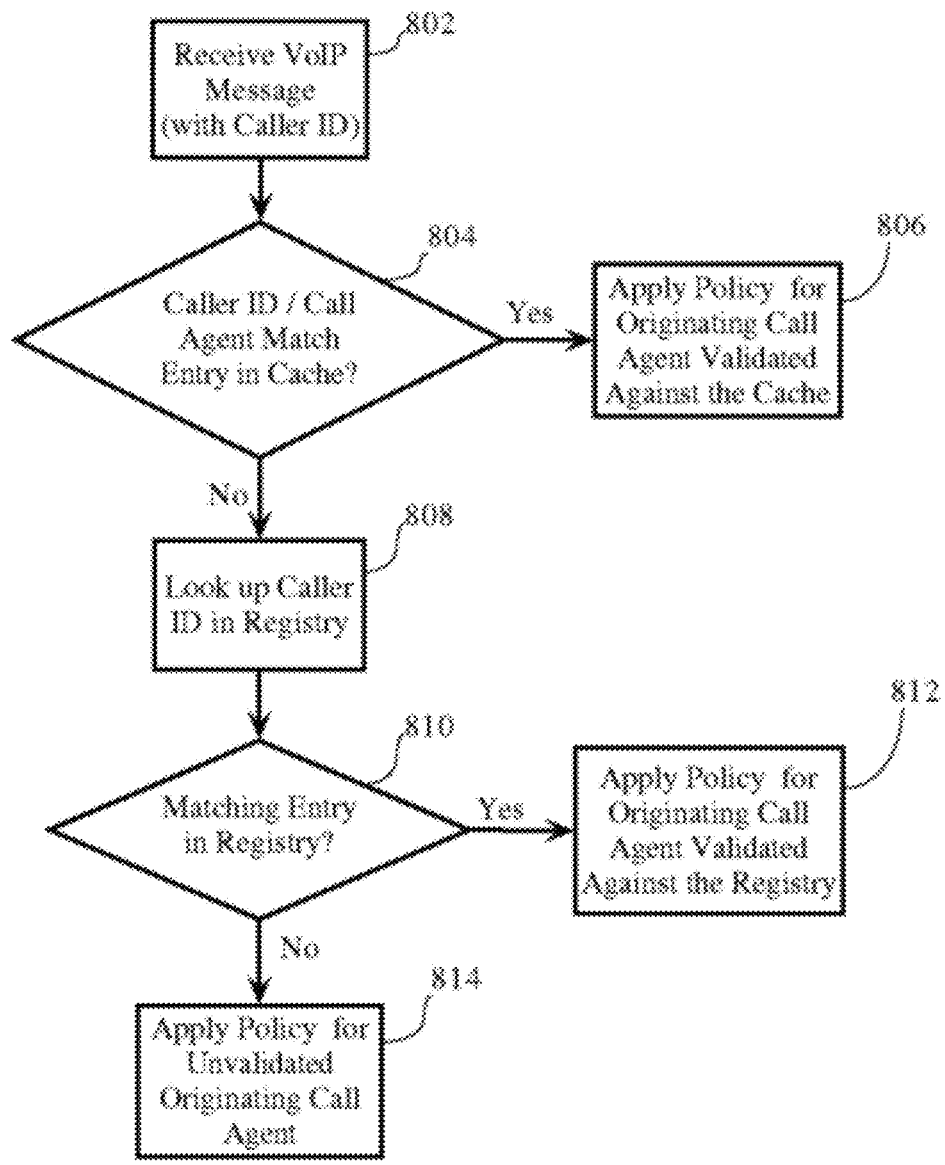
FIG. 8 is a flow chart implemented at a destination call agent and associated with verifying the caller ID in a call initiation message.

FIG. 8 is a flow chart implemented at the destination call agent and associated with verifying the caller ID in a received call setup message. As FIG. 8 shows, the destination call agent receives a call initiation message such as a SIP invite from an originating call agent (802). In one implementation, the call initiation message contains a caller ID. The destination call agent searches its cache for a matching entry to determine if the caller ID matches a phone number in the cache, and whether that number has been verified. If it has been verified, the call agent checks if the identity of the entity sending the call setup request matches the identity of the call agent that was verified (based on matching certificates used in TLS procedures, or based on matching IP addresses, or any other suitable means of comparison) (804). If so, the destination call agent applies one or more policies for originating call agents that are validated against the cache (806). For example, in one implementation, the destination call agent may indicate to the user of the destination client that the sender (originating call agent) is verified. In one implementation, the destination call agent may selectively show the caller ID, or add a symbol or character indicating a valid caller ID. In one implementation, the destination call agent may permit the call, etc.

If the caller ID has not been verified, but matches a number in the cache, or the caller ID does not match any number in the cache, the destination call agent may look for a matching entry in the registry (808, 810). If there is a matching entry in the registry or in the cache, and the identity of the call agent in the registry entry (which may have been cached) matches the identity of the agent that sent the call setup request (based on matching certificates used in TLS procedures, or based on matching IP addresses, or any other suitable means of comparison) the destination call agent applies one or more policies for originating call agents that are validated by the registry (812). Similar to the one or more policies that may be applied in step 806, in particular implementations, the destination call agent may indicate to the user of the destination client that the sender (originating call agent) is verified (and optionally indicate a second level of validation), may show the caller ID, may permit the call, etc. If the caller ID does not match a phone number in the registry, the destination call agent applies one or more policies for unvalidated originating call agents (814). For example, in one embodiment, the destination call agent may indicate to the user of the destination client that the sender is unverified, or may show no caller ID, or may deny the call, etc.

Because a malicious call agent may provide a false caller ID, this process enables a given call agent to provide caller ID information to two levels of verification. As described above, the VoIP may utilize the cache or the registry to verify the caller ID against previous verifications or against an IP address and port number, the former of which cannot be falsified. Accordingly, implementations described herein have an advantage of preventing caller ID spoofing. For example, if an originating call agent of an enterprise launches a SIP call with a fake caller ID, the fake caller ID may match an entry corresponding to a call agent of a different enterprise.

In one implementation, in addition to verifying the caller ID against the cache or against the registry, the destination call agent may also verify the originating call agent according to the verification processes described above in connection with FIGS. 4, 6, 7A, and 7B. As such, an originating call agent using a fake ID would not be able to successfully respond to a request for PSTN call attributes.

In one embodiment, the originating and destination call agents may verify each other based on the same call. For example, in one implementation, the originating call agent may make both a PSTN call and a VoIP call to the destination call agent. When receiving the PSTN call, if the destination call agent determines that the caller ID corresponds to another call agent in the network, the destination call agent holds the PSTN call for predefined time period (e.g., a few seconds). When the VoIP call arrives, mutual authentication is performed. In other words, the originating and destination call agents verify each other as described above. If mutual authentication succeeds, the PSTN call is rejected and the VoIP call proceeds.

This approach provides highly reliable validation of the advertised number blocks in the P2P network, as well as provides a VoIP anti-spam function. In one implementation, if an originating call agent is making too many VoIP calls, even though it is validated, the terminating call agent can reject incoming VoIP calls from that call agent, and redirect it to utilize the PSTN instead. This passes costs onto the originating call agent and therefore helps alleviate VoIP spam.

Also, because this technique uses only telephone phone numbers, it makes it difficult for a spammer to change identifiers. Changing identifiers in email is inexpensive and easy, because domains and user IDs within a domain are practically free and in infinite supply. This is not so with telephone numbers, which are a more expensive and a finite resource. Furthermore, because telephone numbers are used, an enterprise that is spamming can be traced back through its service provider. Black lists also become much more effective, because of the finite namespaces of phone numbers. As described above, implementations of the present invention provide a fully, 100% distributed solution that allows any enterprise to make a VoIP call to any other enterprise in the world, without any central coordination, central services, or configuration. It is completely plug-n-play, and is very secure. Another advantage of the implementations described herein is that they do require any special functionality from PSTN providers. The implementations describe above enable call agents to connect to each other directly over IP without requiring an intermediate service provider for voice services. Connections are seamless for end users, because they can make and receive calls with the phone numbers they already use.

The present invention has been explained with reference to specific embodiments. For example, while embodiments of the present invention have been described as operating in connection with P2P networks and PSTN networks, the present invention may be used in connection with any suitable network environment. Other embodiments will be evident to those of ordinary skill in the art. It is therefore not intended that the present invention be limited, except as indicated by the appended claims.

What is claimed is:

1. A method comprising:
    initiating a public switched telephone network (PSTN) call to a destination telephone number;
    storing an attribute of the PSTN call with a processor;
    verifying with the processor that a Voice-over-Internet-Protocol (VoIP) call agent owns the destination telephone number by receiving an indication from the VoIP call agent that the VoIP call agent has knowledge of the attribute of the PSTN call initiated to the destination telephone number; and
    providing Instant Messaging (IM) with the processor over a VoIP call to the VoIP call agent based on the verification that the VoIP agent owns the destination telephone number.

2. The method of claim 1 wherein the verifying comprises transmitting a query to the VoIP call agent for proof of knowledge of the attribute of the PSTN call, and wherein the receiving the indication comprises receiving a response to the query from the VoIP call agent that demonstrates knowledge of the attribute of the PTSN call.

3. The method of claim 1 further comprising discovering the VoIP call agent by querying a peer-to-peer network for a match with the destination telephone number.

4. The method of claim 3 wherein one or more members of the peer-to-peer network comprises VoIP call agents including the VoIP call agent.

5. The method of claim 1 further comprising discovering the VoIP call agent by querying a central server for a match with the destination telephone number.

6. The method of claim 1 wherein the attribute of the PSTN call comprises a dual-tone multi-frequency (DTMF) value transmitted over the PSTN call.

7. The method of claim 1 wherein the verifying that the VoIP call agent owns the destination telephone number is performed before the PSTN call ends.

8. A system comprising:
    an originating Voice-over-Internet-Protocol (VoIP) call agent comprising a processor and a network interface, wherein the originating VoIP call agent is configured to:
    initiate a public switched telephone network (PSTN) call to a destination telephone number with the processor over a PSTN;
    store an attribute of the PSTN call;
    verify that a destination Voice-over-Internet-Protocol (VoIP) call agent owns the destination telephone number based on receipt of an indication from the destination VoIP call agent over the network interface that the destination VoIP call agent has knowledge of the attribute of the PSTN call initiated to the destination telephone number; and
    provide Instant Messaging (IM) between the originating VoIP call agent and the destination VoIP call agent over a VoIP call based on the verification that the destination VoIP agent owns the destination telephone number.

9. The system of claim 8, wherein the originating VoIP call agent is further configured to provide the IM over the VoIP call before the PSTN call ends.

10. The system of claim 8, wherein the originating VoIP call agent is further configured to provide the IM over the VoIP call when the destination VoIP agent is verified as owning the destination telephone and to provide the IM over the PSTN when the destination VoIP agent is not verified as owning the destination telephone number.

11. The system of claim 8, wherein the originating VoIP call agent is further configured to provide a video portion of an audio-visual communication session over the VoIP call and to provide a voice portion of the audio-visual communication session over the PSTN call in response to the verification that the destination VoIP call agent owns the destination telephone number.

12. The system of claim 8, wherein the attribute of the PSTN call comprises at least one of a start time of the PSTN call or an end time of the PSTN call.

13. The system of claim 8 further comprising a cache, wherein the originating VoIP call agent stores VoIP call routing information in the cache in response to the verification that the destination VoIP agent owns the destination telephone number, and provides the IM over the VoIP call in response to the VoIP call routing information being found in the cache.

14. The system of claim 8 wherein the receipt of the indication includes a use of an authentication protocol to verify that the destination VoIP call agent knows a password mapped from the attribute of the PSTN call without transmission of the attribute of the PSTN call between the destination VoIP call agent and the originating VoIP call agent.

15. Logic encoded in a tangible non-transitory computer readable storage medium executable with a processor to:
    verify that a Voice-over-Internet-Protocol (VoIP) call agent owns a destination telephone number based on receipt of an indication from the VoIP call agent that the VoIP call agent has knowledge of an attribute of a public switched telephone network (PSTN) call initiated to the destination telephone number over a public switched telephone network;
    store VoIP call routing information in a cache in response to the verification that the VoIP call agent owns the destination telephone number; and
    provide Instant Messaging (IM) over a VoIP call to the VoIP call agent in response to the VoIP call routing information being found in the cache.

16. The computer readable storage medium of claim 15, wherein the logic encoded in the computer readable storage medium is further executable to:
    search the cache for the VoIP call routing information based on the destination telephone number;
    initiate the VoIP call if the VoIP call routing information is found in the cache; and
    provide the Instant Messaging (IM) over the PSTN if the VoIP routing information is not found in the cache.

17. The computer readable storage medium of claim 15, wherein the PSTN call attribute comprises at least one of a caller identification, a call length, or a call signature.

18. The computer readable storage medium of claim 15, wherein the PSTN call attribute comprises a call signature, wherein the call signature is based on at least one of frequency spectrum analysis, silence detection, or a password.

19. The computer readable storage medium of claim 15, wherein the verification is performed after the PSTN call ends.

20. The computer readable storage medium of claim 15, wherein the logic encoded in the computer readable storage medium is further executable to identify the VoIP call agent from a search of a registry for the destination telephone number prior to the verification.

* * * * *